United States Patent
Tanaka

[11] Patent Number: 5,896,643
[45] Date of Patent: Apr. 27, 1999

[54] METHOD OF WORKING PRESS DIE

[75] Inventor: Keizou Tanaka, Saitama-ken, Japan

[73] Assignee: Honda Giken Kogyo Kabushiki Kaisha, Tokyo, Japan

[21] Appl. No.: 08/803,026

[22] Filed: Feb. 19, 1997

[51] Int. Cl.[6] .............................. B21B 1/46; B22D 23/04; C23C 6/00
[52] U.S. Cl. .......................... 29/527.1; 29/558; 72/462; 76/107.1; 483/31
[58] Field of Search ................................ 29/527.1, 527.6, 29/557, 558, 565, 431; 72/462; 76/107.1; 483/31; 409/131, 132

[56] References Cited

U.S. PATENT DOCUMENTS

| | | | |
|---|---|---|---|
| 4,459,062 | 7/1984 | Siebert | 403/271 |
| 4,473,937 | 10/1984 | Ortleib | 483/31 |
| 4,510,171 | 4/1985 | Siebert | 427/34 |
| 4,651,405 | 3/1987 | McMurtry | 29/568 |
| 4,656,727 | 4/1987 | Itoh | 29/568 |
| 4,719,690 | 1/1988 | Eckle | 29/568 |
| 4,722,133 | 2/1988 | Nomura et al. | 29/568 |
| 5,690,844 | 11/1997 | White et al. | 219/121.47 |
| 5,705,786 | 1/1998 | Solomon et al. | 219/121.46 |
| 5,719,369 | 2/1998 | White et al. | 219/121.46 |

FOREIGN PATENT DOCUMENTS

| | | | |
|---|---|---|---|
| 59-24535 | 2/1984 | Japan . | |
| 61-164747 | 7/1986 | Japan | 483/31 |
| 63-40621 | 2/1988 | Japan . | |
| 63-144927 | 6/1988 | Japan | 483/31 |
| 6-79568 | 3/1994 | Japan | 483/31 |

*Primary Examiner*—Peter Vo
*Assistant Examiner*—Bobby Rushing, Jr.
*Attorney, Agent, or Firm*—Armstrong, Westerman, Hattori, McLeland & Naughton

[57] ABSTRACT

A working tool and a cladding device are interchangeably mounted on a working head of a working apparatus. First, in a condition in which the working tool is attached to the working head, a die blank is subjected to profiling, and also a predetermined portion is cut to thereby form a beveled portion Then, the working tool on the working head is changed to a cladding device to thereby perform cladding on the beveled portion with a required material. Thereafter, the cladding device on the working head is changed again to the working tool to thereby finish the clad portion into a predetermined shape.

4 Claims, 2 Drawing Sheets

METHOD OF WORKING PRESS DIE

BACKGROUND OF THE INVENTION

1. Field of the Invention

The present invention relates to a method of working (or fabricating) a press die in which a specific portion of the press die is formed or made of a material which is different from a die main body.

2. Description of the Related Art

As a press die, e.g., a trimming die having a blade portion for cutting a blank plate, there is conventionally known one in which the blade portion is formed of a material which is higher in hardness than a main body of the press die.

In manufacturing this kind of trimming die, the following steps are employed Namely, a blank for a trimming die (also called a die blank) is subjected to profiling (ice., machining for profiling purpose) Also, that edge portion of the die blank which corresponds to the blade portion of the trimming die is cut to thereby form a beveled or chamfered portion. This beveled portion is then clad or overlaid with a material that is used for forming the blade portion by means of arc welding or the like. This clad portion is thereafter worked or machined into a predetermined shape to thereby form the blade portion.

In this case, it is normal practice to transfer the die blank, after the beveled portion has been formed, from a working apparatus to a welding machine to thereby perform the cladding work, and thereafter to return the die blank back again to the working apparatus to thereby perform the working or machining of the clad portion.

The above-described method has a disadvantage in that the transfer of the die blank between the working apparatus and the welding machine takes much time, with the result that the productive efficiency is lowered.

In view of the above-described point, the present invention has an object of providing a method of working a press die in which the necessity of transferring of the die blank has been eliminated and which is therefore high in productive efficiency.

SUMMARY OF THE INVENTION

In order to attain the above and other objects, the present invention is a method of working a press die in which a specific portion of the press die is formed of a material which is different from a die main body. The method comprises a first step of machining a die blank for the press die, this first step comprising the sub-steps of setting the die blank on a table of a working apparatus; subjecting the die blank to profiling with a working tool mounted on a working head of the working apparatus; and cutting that portion of the die blank to form a beveled portion which corresponds to said specific portion of the press die; a second step of cladding said material to said beveled portion after changing the working tool on the working head to a cladding device; and a third step of finish-working a clad portion to a predetermined shape after changing the cladding device on the working head to the working tool.

According to the present invention, because the cladding of the beveled portion is performed after changing the working tool on the working head to the cladding device, all of the works inclusive of the cladding work can be performed while the die blank is kept set in position on the table of the working apparatus. It follows that the transferring of the die blank becomes needless.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

Figure 1:
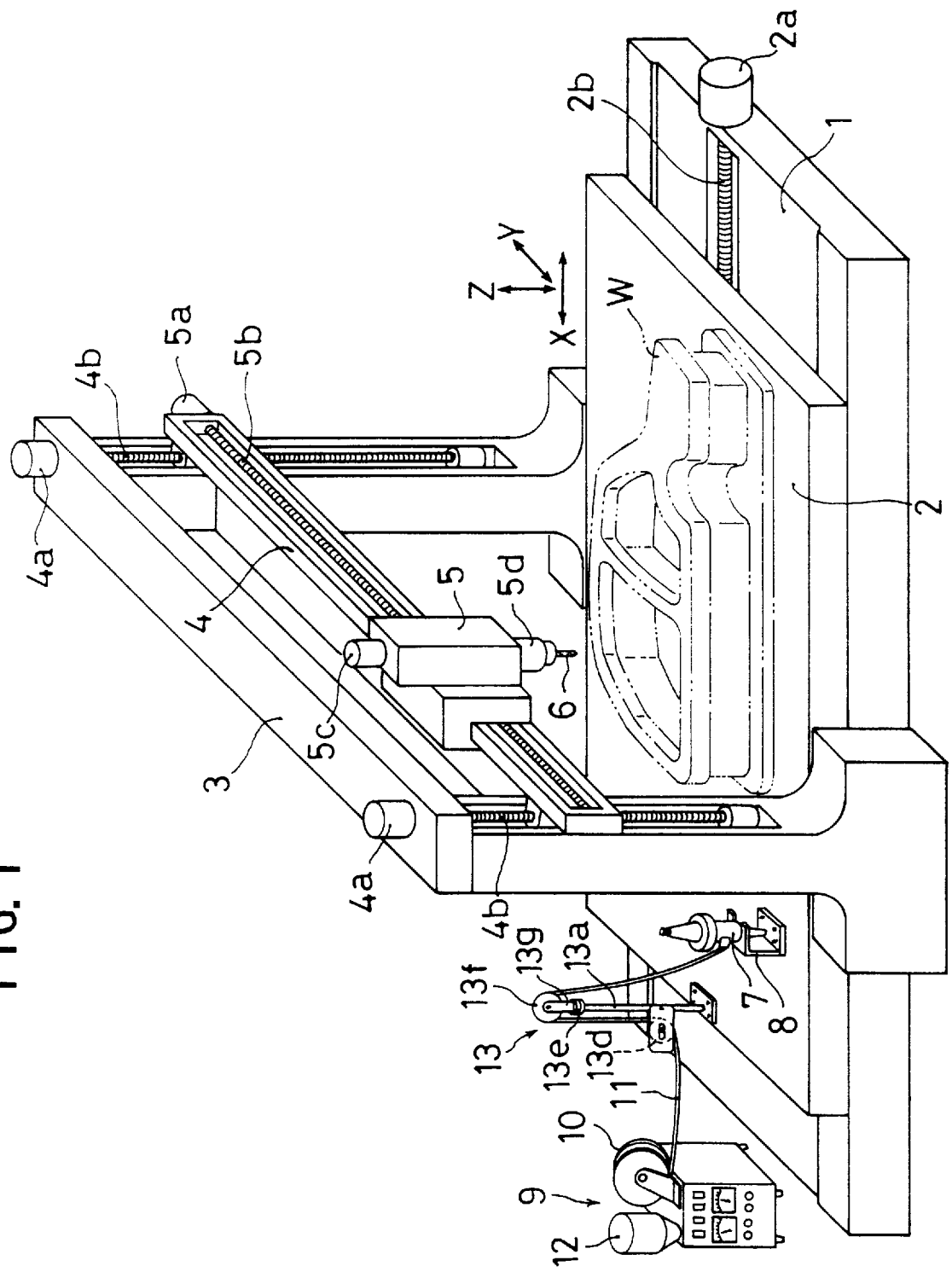
FIG. 1 is a perspective view of a working apparatus to be used in carrying out the present invention.

With reference to FIG. 1, numeral 1 denotes a bed of a working apparatus On this bed 1, there is provided a table 2 which is movable in an X-axis direction by an electric motor 2a via a ball screw 2b, wherein the X-axis direction is defined to be a back-and-forth direction, a Y-axis direction is defined to be in a right-and-left direction, and a Z-axis direction is defined to be in an up-and-down direction On a portal frame 3 which is disposed to span the bed 1, there is provided a movable frame 4 which is movable in the Z-axis direction by an electric motor 4a via a ball screw 4b. On this movable frame 4 there is mounted a working head 5 which is movable in the Y-axis direction by an electric motor 5a via a ball screw 5b. There is thus constituted a three-axis numerically controlled (NC) working apparatus in which the working head 5 is arranged to be movable in the three axes of X-axis, Y-axis, and Z-axis relative to the table 2. A press die blank W, erg., of a trimming die for a side panel of a motor vehicle, is set in position on the table 2 to perform profiling, cladding, and finishing (or finish-machining) of the clad portion.

On the working head 5 there is provided a spindle 5d which is rotatably driven by a spindle motor 5c. A working tool 6 and a cladding device 7 are arranged to be interchangeably mounted on the spindle 5d.

The cladding device 7 is supported on a stock base 8 which is mounted on an end portion of the table 20. After the working tool 6 has been handed over to a tool exchange apparatus (not illustrated), the working head 5 is moved to a position right above the stock base 8 and is then lowered to thereby enable the cladding device 7 to be automatically mounted onto the spindle 5d.

On a side of the bed 1, there is disposed a supply device 9 for supplying the substances required for the cladding work, such as a cladding material, cooling water, gas, etc. as well as electric power. A conduit cable 11 to be led or fed out of a reel 10 on the supply device 9 is connected to the cladding device 7 to thereby supply the above-described substances and electric power via the conduit cable 11. In this embodiment, a plasma spraying torch is used as the cladding device 7, and a hopper 12 for supplying a powdered cladding material is provided on the supply device 9. However, in case an arc welding torch is used as the cladding device 7, a feeding reel for feeding a wire which is made of a cladding material is provided in place of the hopper 12.

Figure 2:
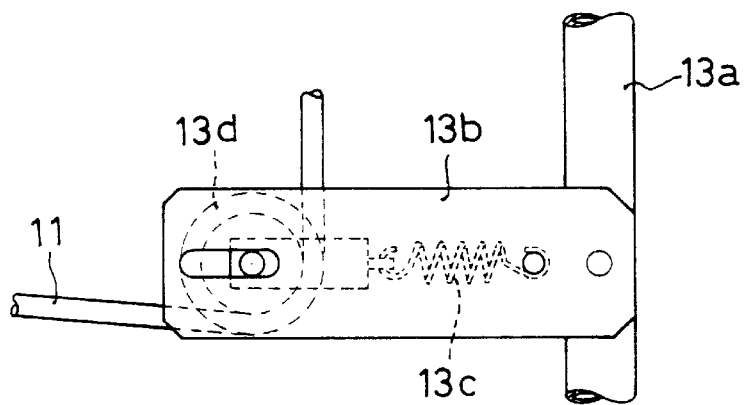
FIG. 2 is a side view of an important portion of a cable guide to be provided on the working apparatus.

On an end portion of the table 2 there is provided a cable guide 130. The cable guide 13 is provided with: a tension pulley 13d which is mounted on a supporting column 13a, vertically disposed on the table 2, via a bracket 13b and which is urged by a tension spring 13c as shown in FIG. 2; and a guide pulley 13f which is rotatably supported on a rotating frame 13g mounted on an upper end of the supporting column 13a so as to be rotatable about a vertical axis via a bearing 13e. When the cladding device 7 is moved while it is mounted on the working head 5, the conduit cable 11 is thus prevented from interfering with the die blank W or the like as a result of hanging down of the conduit cable 11.

Figure 3A:
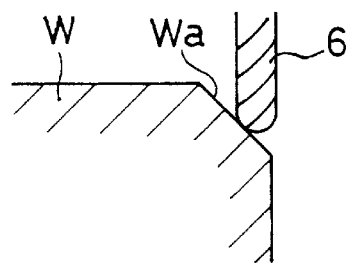
FIGS. 3A through 3C are schematic views showing the procedures of working a die blank.

In working the die blank W, the working tool 6 is first attached to the working head 5, and the die blank W is subjected to profiling Then, that edge portion of the die blank W which becomes the blade portion of the trimming die is cut or chamfered, as shown in FIG. 3A, with the working tool 6 to thereby form a beveled (or chamfered) portion Wa.

Figure 3B:
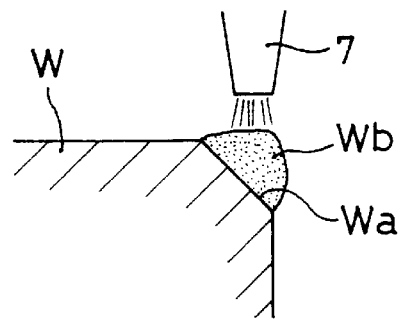

Then, the working tool 6 on the working head 5 is changed to the cladding device 7 to thereby clad a material that is suitable for the blade portion onto the beveled portion Wa as shown in FIG. 3B. In this case, as the cladding device 7 an arc welding torch may also be used. In the arc welding, however, the cladding material is clad in multiple layers in the shape of beads, with the result that blow holes and cracks are likely to occur. On the other hand, if the plasma spraying torch is used as in the present embodiment, the cladding material can be clad substantially in a single layer by means of plasma spraying. As a result, the clad portion of high quality without the defects of cracks, etc. can advantageously be obtained.

Figure 3C:
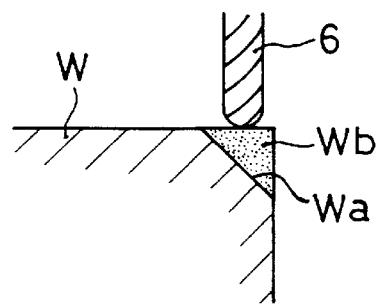

After cladding, the cladding device 7 on the working head 5 is changed once again to the working tool 6 to thereby perform a finish working with the working tool 6 to make the clad portion Wb into a predetermined blade shape as shown in FIG. 3C.

The above-described working tool 6 is not limited to one kind, but tools suitable to profiling work, cutting work of the beveled potion Wa, and the finishing work of the clad portion Wb, respectively, may be selectively used with a help of a tool exchanging device.

Further, in the above-described embodiment, an explanation has been made about an embodiment in which the blade portion of the trimming die is formed of a cladding material. The present invention may also be applied to an embodiment in which that portion of other press die such as a drawing press die or the like which is subjected to a heavy forming load is formed of a cladding material of high hardness.

As can be seen from the above-described explanations, according to the present invention, all the works including the cladding work can be performed while the die blank is kept set in position on the table of the working apparatus. The transferring of the die blank thus becomes needless, resulting in an improvement in the productive efficiency.

It is readily apparent that the above-described method of working a press die meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A method of working a press die in which a specific portion of the press die is formed of a material which is different from a die main body, said method comprising:

a first step of machining a die blank for the press die, said first step comprising the sub-steps of setting the die blank on a table of a working apparatus, mounting a working tool on a working head of the working apparatus, subjecting the die blank to profiling with the working tool, and cutting a portion of the die blank to form a beveled portion which corresponds to the specific portion of the press die;

a second step of cladding the material to the beveled portion, said second step comprising the sub-steps of changing the working tool mounted on the working head to a cladding device, and cladding the material to the beveled portion to form a clad portion by the cladding device;

a third step of finish-working the clad portion to a predetermined shape, said third step comprising the sub-steps of changing the cladding device mounted on the working head to the working tool, and finish-working the clad portion by the working tool to form a predetermined shape.

2. The method of working a press die according to claim 1, wherein said second step further comprises the sub-step of providing the table with a stock base for disposing thereon the cladding device such that the cladding device on the stock base is mountable onto the working head.

3. The method of working a press die according to claim 2, wherein said second step further comprises the sub-step of supplying substances including the material required for the cladding work and electric power from a supply device provided on a side of the working apparatus to the cladding device via a conduit cable.

4. The method of working a press die according to claim 2, wherein said cladding device is plasma spraying torch.

\* \* \* \* \*